(12) United States Patent
Perez et al.

(10) Patent No.: US 6,766,697 B1
(45) Date of Patent: Jul. 27, 2004

(54) HYDRODYNAMIC BEARINGS HAVING STRAIN SENSORS

(75) Inventors: Robert X. Perez, Corpus Christi, TX (US); Natividad S. Ibanez, Pasadena, TX (US)

(73) Assignee: Bearings Plus, Inc., Houston, TX (US)

( * ) Notice: Subject to any disclaimer, the term of this patent is extended or adjusted under 35 U.S.C. 154(b) by 0 days.

(21) Appl. No.: 10/011,836

(22) Filed: Dec. 5, 2001

Related U.S. Application Data

(60) Provisional application No. 60/251,698, filed on Dec. 6, 2000.

(51) Int. Cl.⁷ ................................................. G01L 1/24
(52) U.S. Cl. ............................. 73/800; 73/760; 73/788; 73/789
(58) Field of Search .......................... 73/788, 789, 790, 73/800, 159

(56) References Cited

U.S. PATENT DOCUMENTS

| | | |
|---|---|---|
| 3,952,566 A | 4/1976 | Jacobson |
| 4,027,539 A | 6/1977 | Halloran |
| 4,118,933 A | 10/1978 | Coleman et al. |
| 4,196,629 A | 4/1980 | Philips |
| 4,477,725 A * | 10/1984 | Asawa et al. .......... 250/227.16 |
| 4,941,105 A | 7/1990 | Marangoni |
| 5,140,849 A | 8/1992 | Fujita et al. |
| 5,255,566 A | 10/1993 | Okumura |
| 5,283,852 A | 2/1994 | Gibler et al. |
| 5,408,875 A | 4/1995 | Matsushita et al. |
| 5,452,087 A | 9/1995 | Taylor et al. |
| 5,509,307 A | 4/1996 | Humber et al. |
| 5,509,310 A | 4/1996 | El-Ibiary |
| 5,513,917 A | 5/1996 | Ide et al. |
| 5,557,406 A | 9/1996 | Taylor et al. |
| 5,677,488 A | 10/1997 | Monahan et al. |
| 5,714,680 A | 2/1998 | Taylor et al. |
| 6,065,338 A | 5/2000 | Stoiber et al. |
| 6,170,989 B1 | 1/2001 | Zeidan |
| 6,234,022 B1 | 5/2001 | Tadokoro |
| 6,281,976 B1 | 8/2001 | Taylor et al. |

* cited by examiner

Primary Examiner—Edward Lefkowitz
Assistant Examiner—Alandra Ellington
(74) Attorney, Agent, or Firm—Jack Lo

(57) ABSTRACT

A hydrodynamic bearing includes a fiber optic sensor for measuring static and dynamic bearing forces or loads during operation. The fiber optic sensor is positioned within the bearing through the most direct load path, which is through the pad support for a tilting pad style bearing. In additional to being positioned in the pad support of a tilting pad bearing, the sensor is also placed 1) inside the pad support or on the pad support structure, and 2) oriented perpendicularly with the shaft centerlines. After the sensor location is chosen and the sensor is properly positioned, a calibration procedure is utilized to determine the relationship between the radial load and measured strain for the specific bearing. Once the calibration factor has been determined, the sensor may be utilized in the bearing to measure load during operation.

10 Claims, 10 Drawing Sheets

HYDRODYNAMIC BEARINGS HAVING STRAIN SENSORS

CROSS REFERENCE TO RELATED APPLICATIONS

This application claims priority under 35 U.S.C. §119(e) to U.S. Provisional Patent Application Serial No. 60/251,698, entitled MEANS FOR MEASURING FORCES ON BEARINGS, filed Dec. 6, 2000, the contents of which are incorporated herein by reference.

TECHNICAL FIELD

The invention relates generally to hydrodynamic bearings including strain sensors and, more particularly, to hydrodynamic bearings containing fiber optic sensors for measuring static and dynamic bearing loads on the bearings during operation.

BACKGROUND OF RELATED ART

Hydrodynamic or fluid film bearings are widely employed as rotor supports in industrial machinery having high horsepower and high loads. A basic purpose of such bearings is to provide a relatively frictionless environment to support and guide a rotating shaft. Various designs for hydrodynamic bearings have evolved over time. Some bearings such as the lemon bore and pressure dam designs have a fixed geometry, without moving parts. In contrast, other bearings have a variable geometry, with the bearing pads flexing, pivoting or otherwise moving in response to changing load conditions in order to stabilize the bearings during use. Examples of variable geometry bearings include the ball-in-socket design, the rocker design, and the Orion® bearing. Another style variable geometry bearing is the Flexure Pivot® tilt-pad bearing, which is owned by the Assignee of the present application, and described in U.S. Pat. No. 5,513,917, the contents of which are incorporated herein by reference. Whether fixed or variable geometry, all hydrodynamic bearings share the common characteristic of having a cylinder which surrounds the rotating shaft and which is filled with some form of fluid lubricant, such as oil. The fluid is the medium that supports the shaft to prevent metal to metal contact. As the shaft rotates, an oil wedge is created that supports the shaft and relocates it within the bearing clearances.

Hydrodynamic bearings have many differing designs to compensate for differences in load requirements, machine speeds, cost, and/or dynamic properties. Regardless of the design of the hydrodynamic bearing, as the shaft rotates imbalance and eccentricity can cause the shaft to exert a dynamic load on the bearing, particularly on the bearing pads. This can lead to fretting wear on the pad support surfaces and fatigue of the babbit metal of the bearing, and eventually lead to bearing destruction which, in turn, can cause catastrophic failure. Prior art attempts to measure the loads on hydrodynamic bearings during use have not been successful due to various factors. In particular, failures have resulted from the environmental conditions under which the bearings operate (namely high temperatures, high pressures and moisture), and from the design of the measuring devices themselves which, when installed, affected bearing performance. One example at a past attempt to measure the dynamic loads or forces on hydrodynamic bearings during operation is disclosed in U.S. Pat. No. 4,027,539 to Halloran. The Halloran patent discloses the use of two force probes mounted on the bearing to sense the force components in two perpendicular directions. A piezo-electric load cell in each force probe measures the frequency and a proportional amount of the amplitude of the force component in its direction during operation, and converts the sensed frequency and amplitude into an electrical signal. The sensed amplitude in each direction is calibrated to actual amplitude and the calibrated signals are displayed on an oscilloscope. In use, the mounting of the Halloran device can, itself, adversely affect bearing performance. In addition, the piezo-electric load cell is vulnerable to failure in high temperature environments. Thus, dynamic load sensors (an example of which is the Halloran device) are not currently utilized in the industry.

Bearings can also become subject to instability which manifests itself as oil whirl or oil whip. Left uncorrected, this phenomenon is catastrophic and can destroy the bearings, seals, and the rotor very quickly. Oil whirl normally occurs in lightly loaded bearings, where the oil whirling forces, which are usually manifested at about 42% to 48% of rotor speed, begin to dominate and actually carry the rotor in the direction of rotation. If the rotor speed increases to a point where the oil whirl frequency coincides with the rotor's first natural frequency, oil whip occurs. Oil whip is a dangerous condition where rotor damping is unable to limit the rotor's motion so that displacement amplitudes continue to grow until halted by contact with stationary parts, such as internal seals. Once this type of internal contact exists, the rotor begins to precess, in a reverse direction from rotor rotation direction, using the entire bearing clearance. This condition leads to high friction levels which will overheat the babbit metal and leads to rapid destruction of the bearing, rotor journal, and the machine seals.

In order to prevent such occurrences, proximity probes have also been developed to monitor the relative motion between the shaft and the bearing. Proximity probes have been utilized to measure the relative vibration of the shaft as well as the relative position of the shaft with respect to the bearing clearances (i.e. displacement). Although these probes have been useful, they suffer from significant drawbacks. Such probes are costly to install in machines and may not be able to be installed in all machines. In addition, they are subject to run out problems because the effectiveness of the probes (which are electromagnetic) relies on the continuity of the surface of the shaft. Even small imperfections in the surface of the shaft can lead to false read outs, especially at high speeds. Also, the proximity probes are often permanently damaged by their operating environment (high temperatures, forces, etc.) and are costly to replace. These sensors can also be unreliable due to their operating environment, and further lack the sensitivity to detect damaging levels of vibration at speeds above 40,000 to 50,000 rpm. The disadvantages with such probes increases when trying to use the probes with small rotors, such as those found in turbo chargers and micro turbines, where it becomes increasingly difficult to accurately measure displacement with the probes. Such probes also do not measure the dynamic loads which can cause bearings to wear, as discussed above.

Accordingly, there is needed in the art a sensor which can measure dynamic forces or loading of a bearing during operation in a reliable manner, and which may also detect unwanted displacement of the shaft and bearing prior to catastrophic failure.

SUMMARY

A hydrodynamic bearing including a fiber optic sensor for measuring static and dynamic bearing forces or loads during operation which is cost effective to use, easily installed and reliable during operation is disclosed herein. In one embodiment, the fiber optic sensor is a fiber Fabrey Perot interferometor sensor having internal mirrors spaced from each other within a fiber, as described below.

The sensor is disposed within the bearing through the most direct load path, which is through the pad support for a tilting pad style bearing. The sensor may be disposed in one, more than one, or all of the pad supports, depending upon the particular application. In addition to being disposed in the pad support of a tilting pad bearing, the sensor should also be placed 1) inside the pad support or on the pad support structure, and 2) oriented perpendicularly with the shaft centerline, "c". After the sensor location is chosen and the sensor is properly positioned, a calibration procedure is utilized to determine the relationship between the radial load and measured strain for the specific bearing. Once the calibration factor has been determined, the sensor may be utilized in the bearing to measure load during operation, as described herein below. In one embodiment disclosed herein, the sensor is utilized in a Flexure Pivot® bearing, while in a second illustrative embodiment, the sensor is disposed in a ball-in-socket bearing.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DETAILED DESCRIPTION OF THE ILLUSTRATIVE EMBODIMENTS

A hydrodynamic bearing assembly 10 including a fiber optic strain sensor 12 for measuring the static and dynamic loads on the bearing 11 during operation is illustrated in FIGS. 1–6. As used herein, the term "hydrodynamic" bearing refers to any bearing having a cylinder which surrounds a rotating shaft and is filled with some form of fluid lubricant, such as oil. Such bearings may be either fixed or variable geometry bearings, as described above. The description which follows includes a Flexure Pivot® hydrodynamic tilt-pad bearing as well as a ball-in-socket hydrodynamic bearing, but is expressly not limited only to these two configurations.

Figure 1:
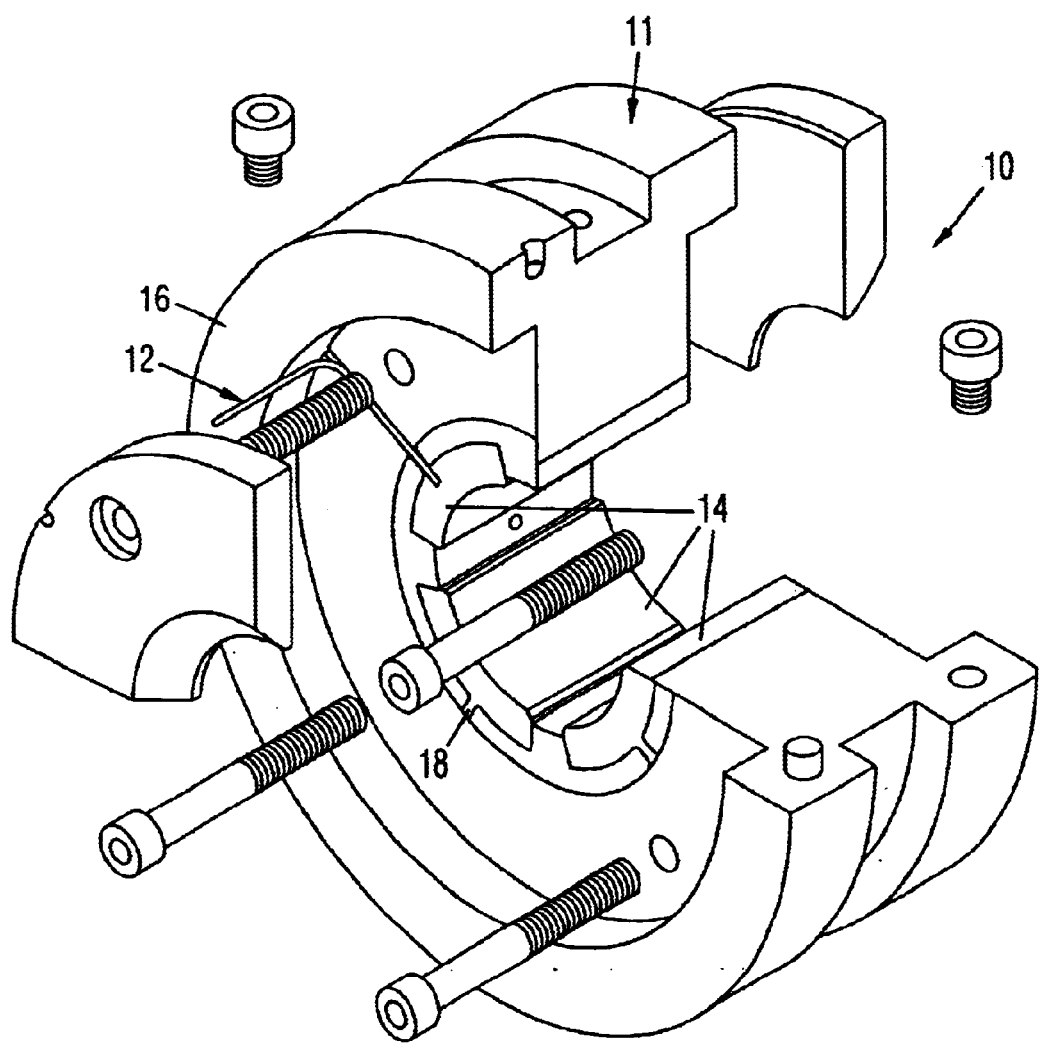
FIG. 1 is a partially exploded perspective view of a Flexure Pivot® tilt-pad hydrodynamic bearing having a fiber optic sensor positioned within at least one bearing pad for measuring static and dynamic loads on the bearing according to a first embodiment.
Figure 2:
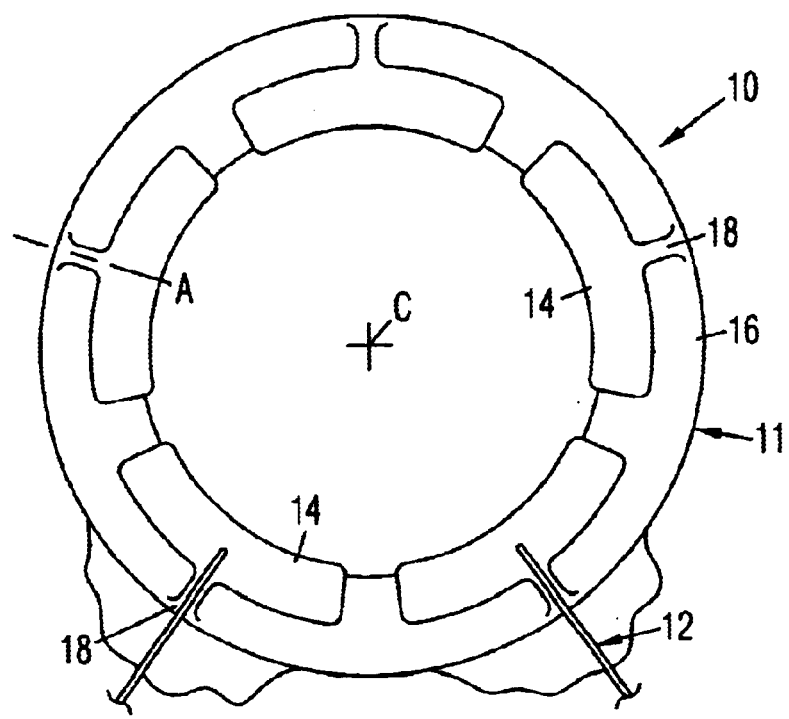
FIG. 2 is a top plan view of a second Flexure Pivot® bearing having a fiber optic sensor positioned within more than one bearing pad for measuring the static and dynamic loads on the bearing.
Figure 3:
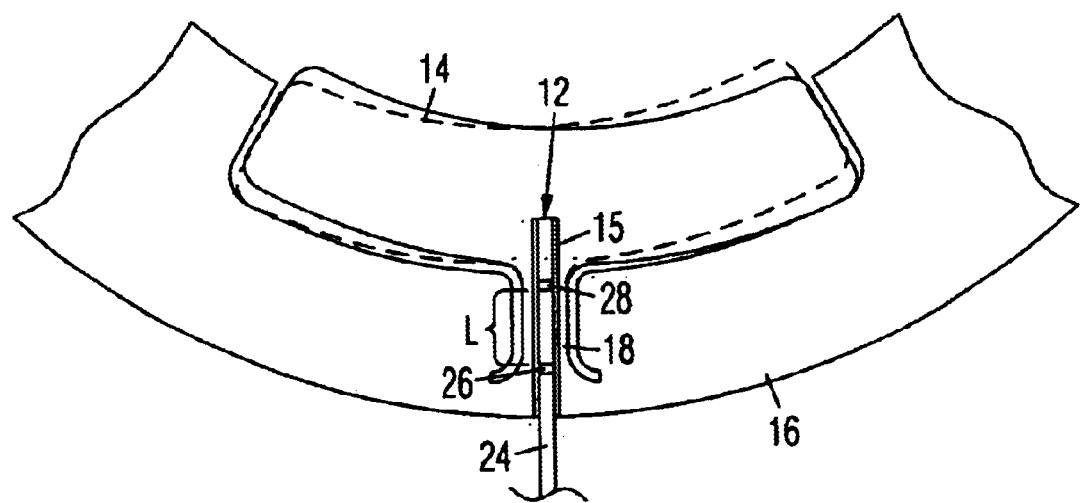
FIG. 3 is a an enlarged view of one of the bearing pads of FIG. 2 during operation.

Referring initially to the embodiment of FIGS. 1–3, a Flexure Pivot® hydrodynamic tilt-pad bearing 11 which is available from KMC, Inc. of West Greenwich R.I., is illustrated. The bearing 11 is designed to operate in a liquid filled environment and includes one or more tilting bearing pads 14. In operation, the pads tilt so as to pressurize the liquid. Due to their construction, tilting pad bearings such as the Flexure Pivot® bearing, cannot support static pad torque or moment, since the pads will instantly tilt if the load shifts for some reason. Because the tilting pad cannot support a static moment, the load acting on the pad passes through the pad support. In the present embodiment, the bearing pads 14 are each supported on a bearing housing 16 via a single, thin web or post 18. The posts 18 extend generally radially between the pads 14 and the housing 16, and provide support to the pads with enough radial stiffness to support the shaft loads without becoming over stressed. Since the load acting on the pads passes through the posts 18, in order to measure the dynamic loads the sensor 12 is placed in one or more posts 18, and into the corresponding pad 14.

In addition to being placed into the pad support of a tilting pad bearing, the sensor needs to be placed in the proper orientation, i.e. in line with the expected pad load. Since in tilting pad bearings radial vibration generates radial dynamic loads, the fiber optic strain sensor should be placed 1) inside the pad support or on the pad support structure, and 2) oriented perpendicularly with the shaft centerline, "c". As shown in FIG. 2, the fiber optic strain sensor 12 is positioned within the bearing 10 such that sensor 12 runs through the approximate central axis "a" of the post 18, which is oriented perpendicularly with the shaft centerline, "c", and the sensor is partially inserted into the corresponding bearing pad 14. In order to secure the sensor, a channel 15 may be formed in the housing, through the approximate axis of the post, and into the bearing pad. The channel may be formed in any suitable manner, for example, by drilling or the like, and may be positioned on the exterior of the housing, or centrally within the housing. The fiber optic sensor 12 is then inserted within the channel 15 and secured in place. For example, the sensor may be secured within the channel by adhesive, such as epoxy, or in any other suitable manner. Alternatively, the sensor may be inserted within the channel and frictionally held in place. Because the bearings utilize fluid, a seal is also preferably disposed in the channel (not shown) to prevent fluid leakage through the channel. Sensors may be placed in one or more pads depending upon the particular application. For example, in the embodiment of FIG. 1, the sensor is illustrated as being disposed in only one pad, while in the embodiment of FIG. 2, two sensors are provided in two of the pads.

In the present embodiment, the fiber optic sensor 12 includes a Fabry-Perot Interferometer disposed within a fiber 24. The Fabry-Perot Interferometer (FFPI) sensor further includes internal mirrors 26 and 28 separated by a length, "L", which defines an optical cavity 27 of the fiber 24. Each mirror is produced by a known process of vacuum depositing a thin film of dielectric material $TiO_2$ on a cleaved end of the fiber. The fiber 24 preferably consists of a fiber core combined with a cladding of lower refractive index to form an optical wave guide. The FFPI sensor is known in the art and is available from Fiber Dynamics, Inc. of Bryan, Tex. and is described in U.S. Pat. No. 5,452,087, which contents are herein incorporated by reference.

As described int the '087 patent, the pressure or load to be measured is provided by the optical signal from the FFPI, which may preferably function as a highly sensitive strain transducer. The reflectance of the FFPI is a function of the optical path length nL of the interferometer, where n is the effective refractive index of the guided mode of the fiber. Consequently, a longitudinal strain (i.e., change in L) affects the fraction of the incident optical power which is reflected by the FFPI. By measuring this reflected optical power with an oscilloscope, the magnitude or value of the strain may be determined. Only changes that affect the fiber in the region between mirrors 26 and 28 are sensed (Col. 4, lines 20–29 '087 patent). Thus, for tilt pad bearings the optical cavity, i.e. the region between the two mirrors 26 and 28, is preferably positioned within the bearing support member. As shown in FIG. 3, for the Flexure Pivot® bearing of the present embodiment, the optical cavity is positioned within the post 18, as are the mirrors 26 and 28. However, one or both of the mirrors may, alternatively be positioned outside of the post 18, for example within the bearing pad 14, provided that the optical cavity is disposed within the post 18. FFPI sensors are well suited for use with bearings because of their rugged characteristics, including being immune to electromagnetic interference, being able to operate effectively to about 400° C., and being able to be used in hazardous environments without concern. In addition, FFPI sensors have excellent sensitivity (about 0.002–2.0 µstrain), are compact, and along with a signal conditioning unit (SCU) can respond to frequencies from about 0–50 kHz+. Alternatively, other fiber optic sensors, for example the Bragg Diffraction Grading Sensor, may be utilized.

As described herein above, the sensor or sensors are positioned within the bearing 10 such that loads exerted on the bearing are transmitted through the sensor. For a tilting pad bearing the most direct load path is through the pad support, which is through the posts 18 in the present embodiment. When a load is applied to the bearing, it travels through the FFPI sensor, causing the mirrors to move closer together as the load is increased. As the length, "L", of the optical cavity changes, the reflected optical power is measured. By utilizing a predetermined calibration factor, as described below, the dynamic force on the bearing can then be determined. Because the measurement of the dynamic load is dependent upon movement of the mirrors, it is important that no other external loads (especially lateral, compressive loads) be applied to the sensor prior to or during operation of the bearing.

It should be noted that under high dynamic loading that the pad load may or may not instantaneously pass directly through the pad support due to pad inertia, damping, and friction. However, the mean load will pass though the pad support even under high dynamic loading, and the alignment between the actual instantaneous pad load and fiber optic sensor should provide a sufficiently accurate measurement even under these conditions.

Figure 8:
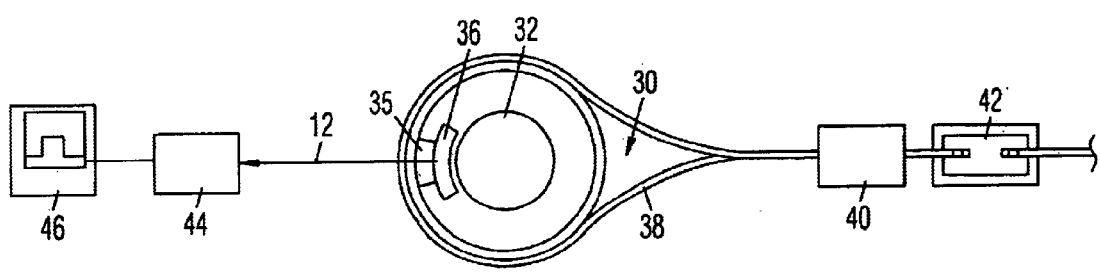
FIG. 8 is schematic top view of a calibration test set up for a tilt pad bearing.
Figure 9:
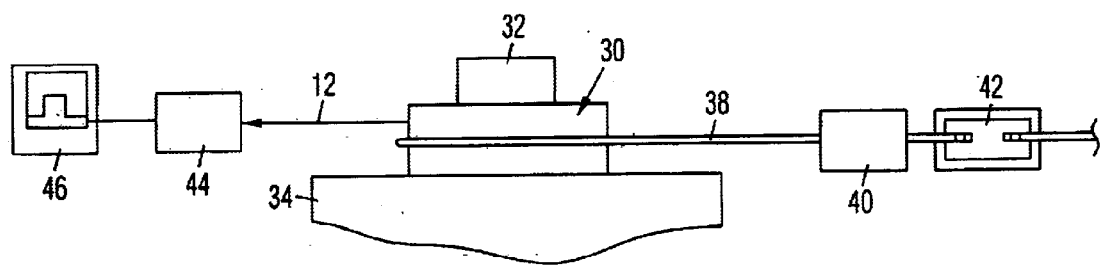
FIG. 9 is a schematic side view of the calibration test set up of FIG. 8.
Figure 10:
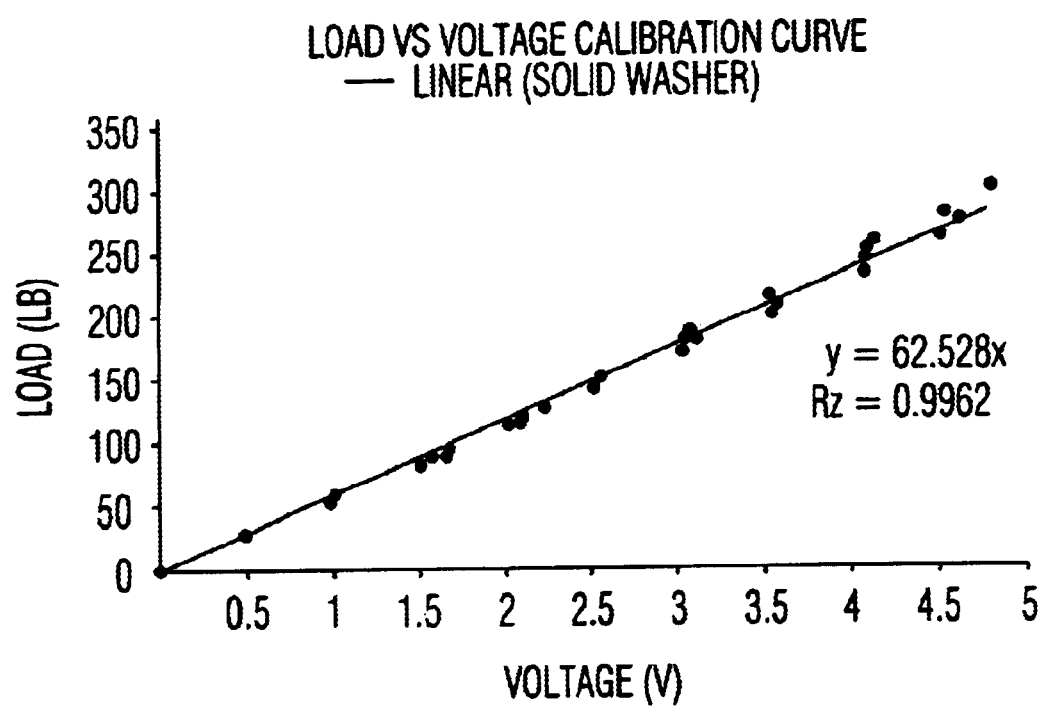
FIG. 10 is a graph showing the calibration curve for a tilt-pad, ball-in-socket bearing.

After the sensor location is chosen and the sensor is properly positioned, a calibration procedure is utilized to determine the relationship between the radial load and measured strain for any specific hydrodynamic bearing. For tilting pad bearings of all types, one manner of calibration is to utilize a "dummy" or non-rotating shaft. Utilizing this method, the bearing pads are first removed, or are rendered inoperable, except for the pad being calibrated. As shown in FIGS. 8 and 9, the bearing assembly 30 is placed around a dummy, or non-rotating shaft 32, which is attached securely to a support member 34, so that the bearing is lying flat on the support and the shaft is pressed against he bearing pad 36 being calibrated. The fiber optic sensor 12 is inserted into or on the pad support 35 for the particular type of bearing, and may also be inserted into the bearing pad 36, depending upon the type of bearing being calibrated. A cable 38 or other similar device is then wrapped around the outer circumference of the bearing assembly 30 and the ends of the cable are connected to some fixed point. A calibrated static force sensor 40, such as a load cell, is inserted in the cable. A tension device 42 for varying the tension of the cable is also provided. For example, a turn buckle may be attached to the cable, or some other type of threaded device, to selectively increase or decrease the cable tension by adjusting the length of the cable. As tension is applied, the bearing assembly moves against the stationary dummy shaft and will generate a static load on the bearing pad 36 being calibrated. This method of calibration ensures that the test load will pass directly through the pad support and fiber optic sensor 12 positioned therein. Thus, the load measured by the static force sensor 40 is the same load applied to the fiber optic sensor 12 (i.e. measure load=applied load). For an FFPI sensor, the FFPI Signal Conditioning Unit (SCU) 44 is connected to the FFPI sensor 12 in the bearing pad support. At different applied loads, varying strain levels will result in varying SCU output voltages, which are preferably displayed on an oscilloscope 46. These varying values can then be recorded and plotted. The resulting plot will be a calibration force versus voltage plot that is linear. An exemplary graph showing a calibration force vs. voltage which was plotted utilizing the above calibration method for a 2.5 inch, four (4) pad, ball-in-socket bearing is illustrated in FIG. 10. After calibration vs. force is plotted, the calibration factor (lbs/volt) can then be extracted from the resulting curve. Once the calibration factor is determined, force information can be readily inferred from the dynamic SCU voltage signal. Alternatively, other calibration procedures may be utilized, as would be known to those of skill in the art.

Figure 4:
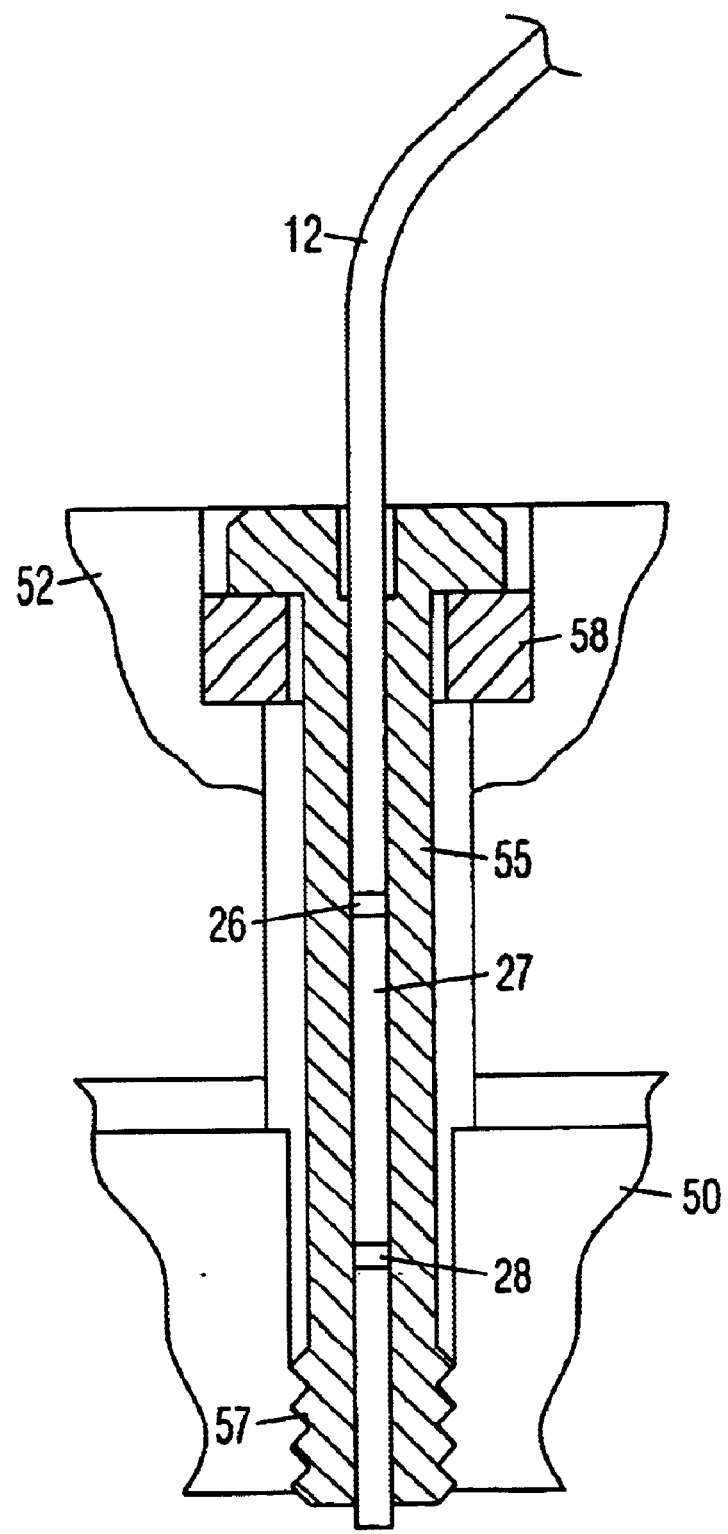
FIG. 4 is a cross sectional view of a mounting device including the fiber optic sensor positioned within a ball-in-socket type bearing for measuring static and dynamic loads on the bearing according to a second embodiment.
Figure 5:
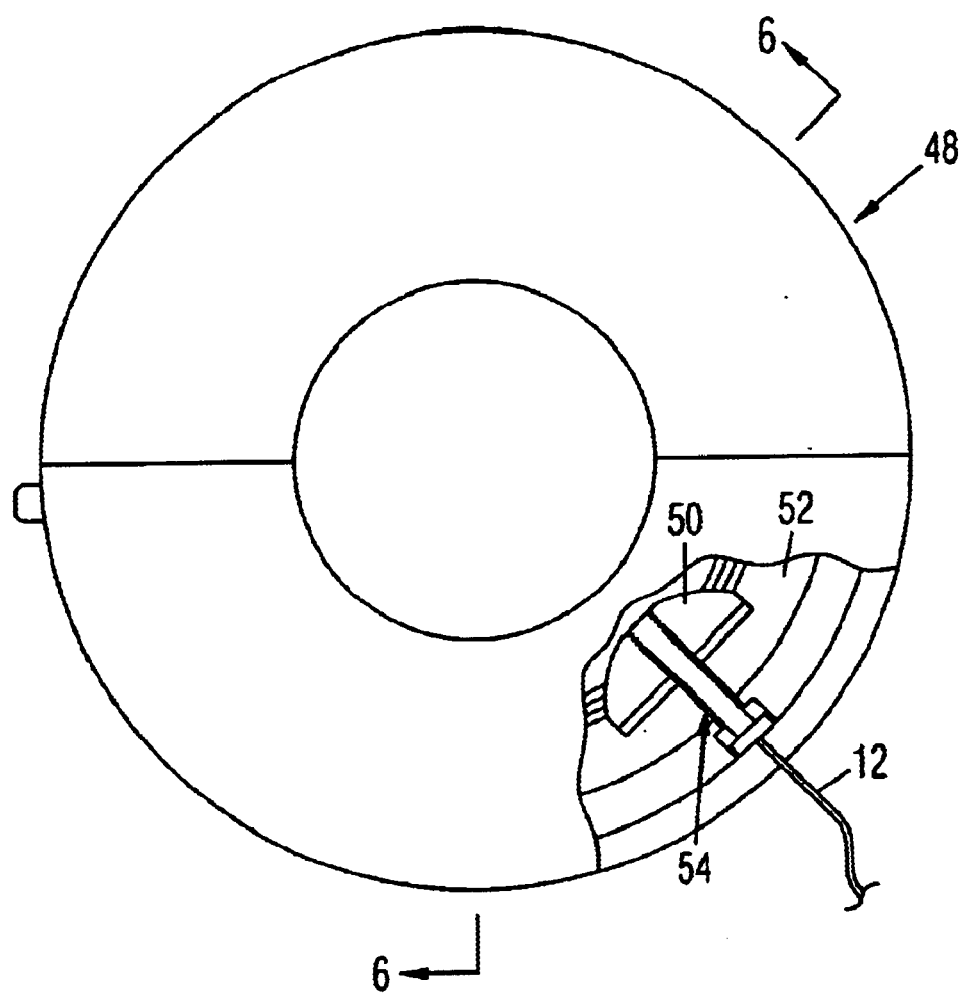
FIG. 5 is a top plan view of the ball-in-socket type bearing of FIG. 4 with a single fiber optic sensor received in one of the balls.
Figure 6:
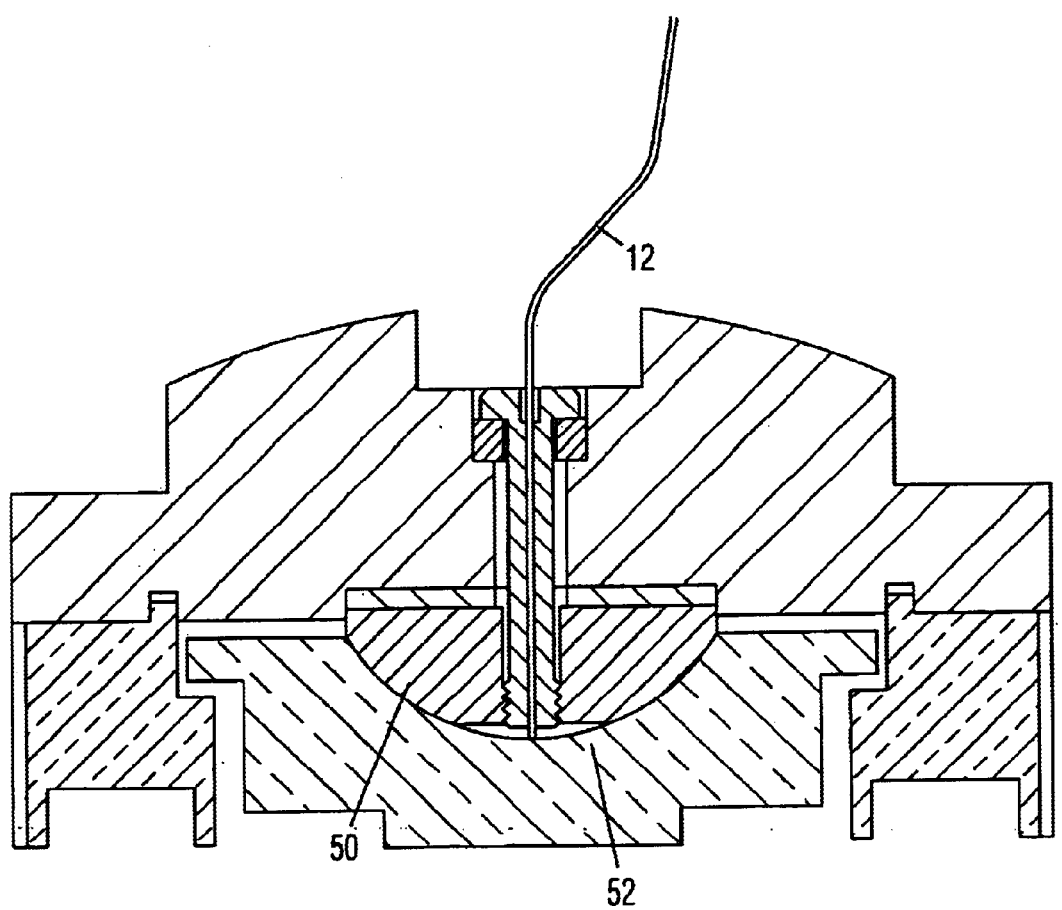
FIG. 6 is a cross sectional view of the ball-in-socket taken along line 6—6 of FIG. 5.

Referring now to FIGS. 4–6, an exemplary ball-in-socket bearing assembly 48 including a fiber optic sensor 12 for measuring dynamic load on the bearing is illustrated. As with the previous illustrative embodiment, the fiber optic sensor 12 should be placed through the most direct path for the expected pad load. In a ball-in-socket bearing, the load will travel directly through the ball 50. Accordingly, the fiber optic sensor 12 is placed within the approximate center of the ball 50 in the present embodiment (FIG. 6). The sensor 12 may be a FFPI sensor, as described herein above with reference to the Flexure Pivot® bearing.

Figure 7:
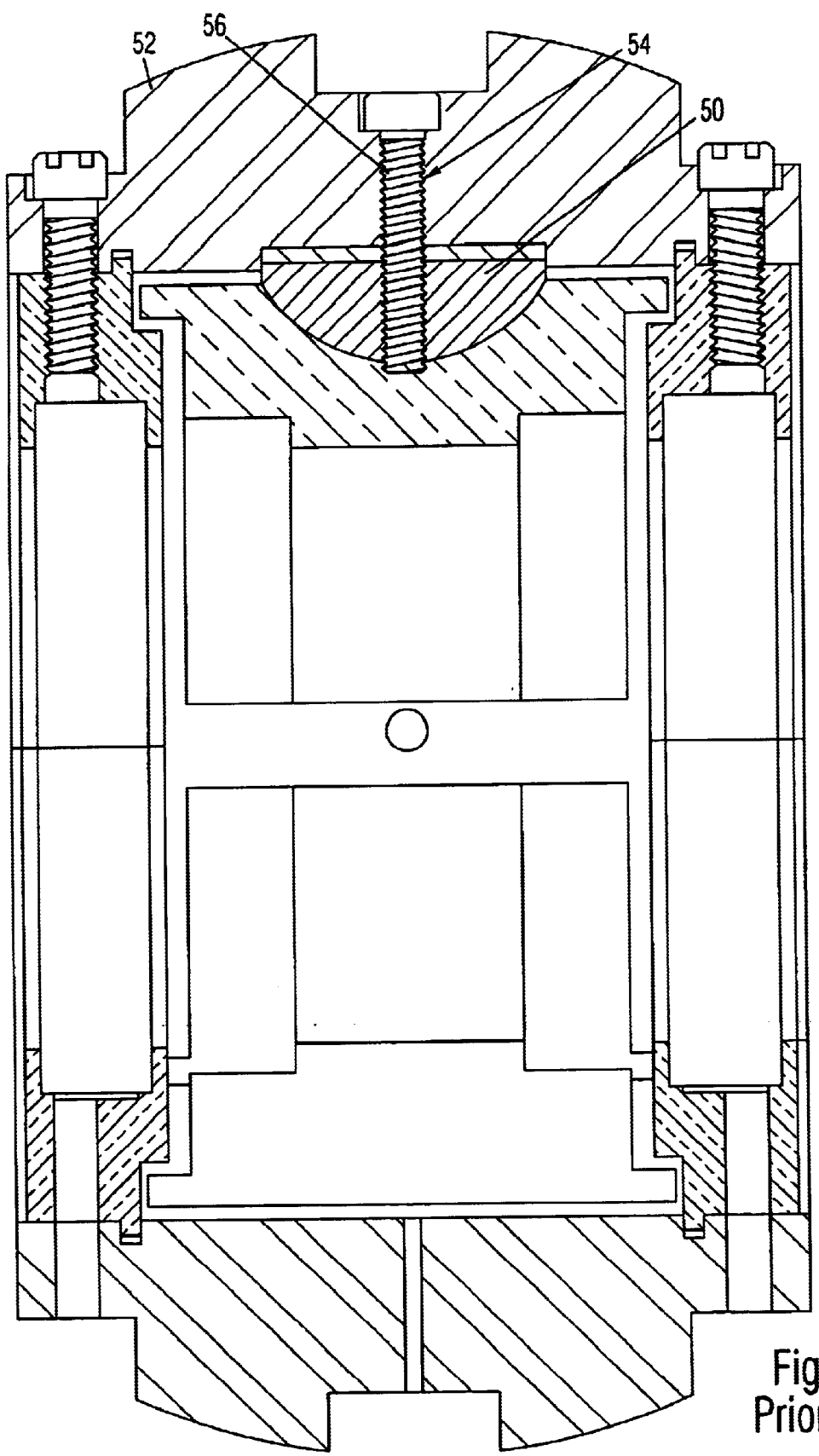
FIG. 7 is a cross sectional view of a prior art ball-in-socket bearing.

A conventional ball-in-socket bearing is illustrated in FIG. 7. As can be seen in this figure, the ball 50 is secured to housing 52 at its center by a fastener such as bolt 54, which is threaded along its length. As previously described above, it is important for proper load measurement that the FFPI sensor 12 not be exposed to external lateral, compressive loading. Prior art bolts such as the bolt 54 illustrated in FIG. 7 include threads 56 along the length of their outer diameter. When the bolt is tightened, it compresses along the threads. In order to relieve this compressive force so as to not affect the measured loads, the threads are positioned along only a bottom portion 57 of the bolt 55 in the present embodiment (see FIG. 4). The FFPI sensor may then be inserted within a channel disposed in the bolt, and may be secured therein by adhesive or the like. Alternatively, the sensor may be inserted within the channel and friction ally held in place without adhesive. The mirrors 26, 28 of the FFPI sensor are preferably positioned within the bolt above the threaded portion, in order to avoid the lateral, compressive loads associated with the threads. At least one mirror is preferably positioned within the ball, while the other mirror can be positioned anywhere spaced from the bottom threaded portion 57. A washer 58 may be positioned below the bolt head in order to lock the bolt in place. Because the bearings utilize fluid, a seal is also preferably disposed in the channel (not shown) to prevent fluid leakage through the channel. Sensors may be placed in one or more balls, depending upon the particular application. Alternatively, if a bolt is not utilized to secure the ball 50 to the housing 52, the sensor 12 may be inserted into a channel formed in the central portion of the ball.

Use of the bearing assembly will now be described with continued reference to the figures.

As described above, the sensor is inserted within the bearing through the most direct load path, which is through the pad support for a tilting pad style bearing. The sensor may be inserted into one, more than one, or all of the pad supports, depending upon the particular application. If inserted into more than one pad, the forces from each pad will need to be resolved by adding the forces vectorally to get the total load. In addition to being placed through the pad support of a tilting pad bearing, the sensor should also be placed 1) inside the pad support or on the pad support structure, and 2) oriented perpendicularly with the shaft centerline, "c". After the sensor location is chosen and the sensor is properly positioned, a calibration procedure is utilized to determine the relationship between the radial load and measured strain for the specific bearing, as described above. Once the calibration factor has been determined, the sensor may be utilized in the bearing to measure load during operation. As load is applied to the bearing, it travels through the FFPI sensor, causing the mirrors within the sensor to move and the reflected optical power to change. This results in varying SCU output voltages, which are preferably displayed on the oscilloscope and recorded. By utilizing the predetermined calibration factor, these recorded measurements can be readily converted to load.

The present disclosure will be further illustrated by the following example, which is intended to be illustrative in nature and is not to be considered as limiting the scope of the disclosure.

WORKING EXAMPLE

Figure 11:
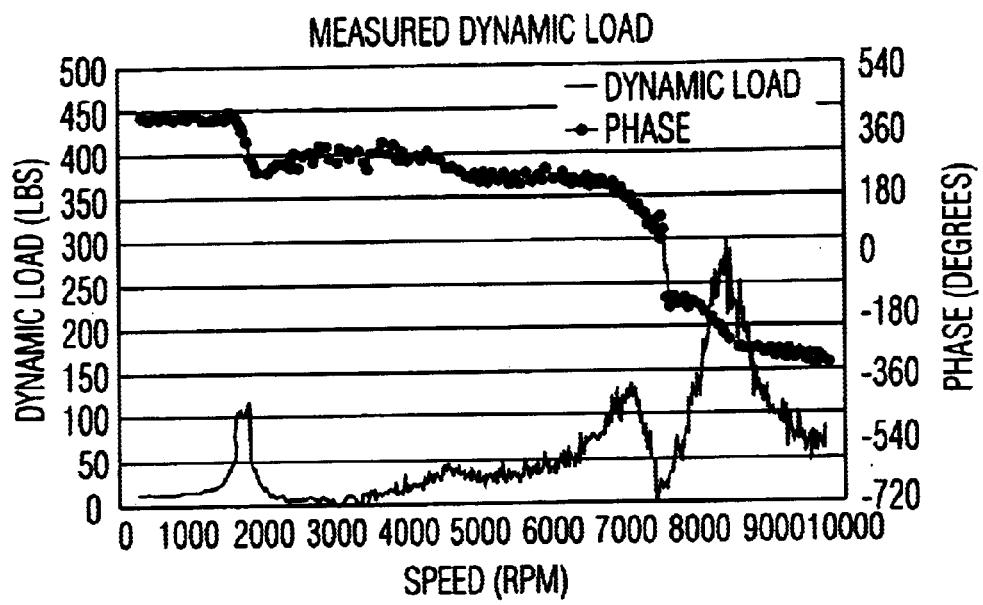
FIG. 11 is a graph showing an exemplary measured dynamic load for a ball-in-socket style bearing.
Figure 12:
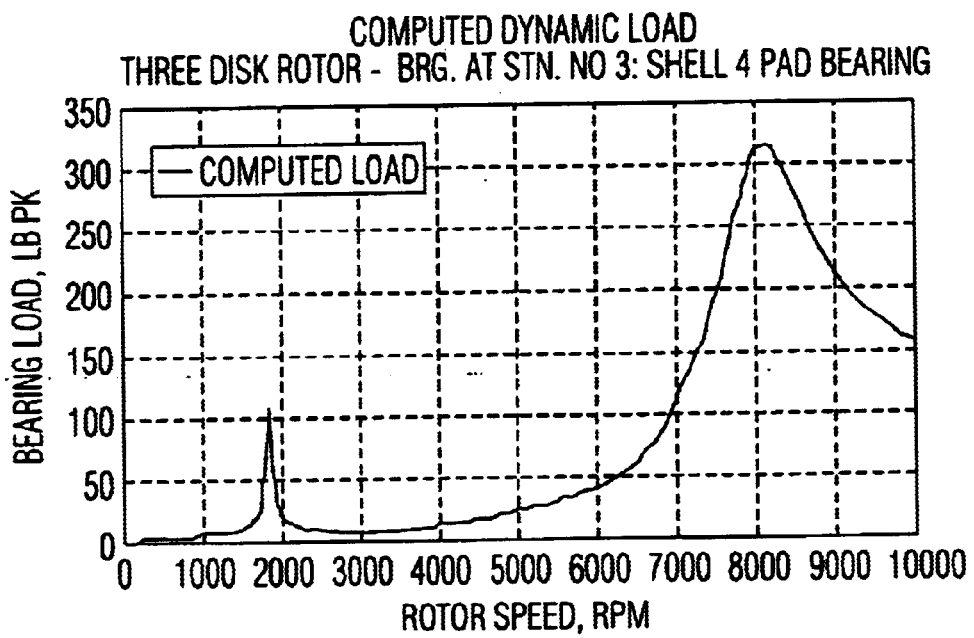
FIG. 12 is a graph showing an exemplary computed dynamic load for a ball-in-socket style bearing.
Figure 13:
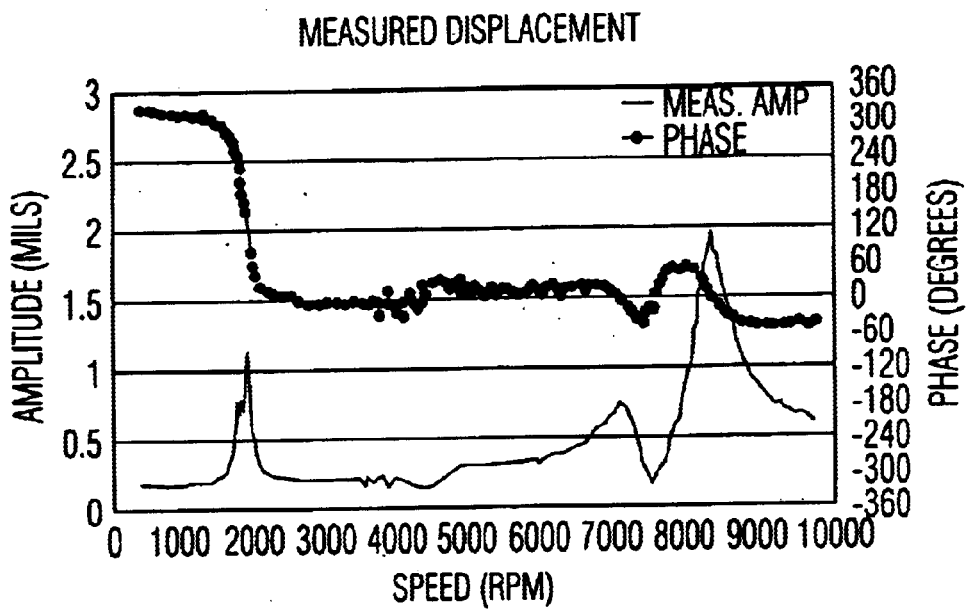
FIG. 13 is a graph showing an exemplary measured displacement for a ball-in-socket style bearing.
Figure 14:
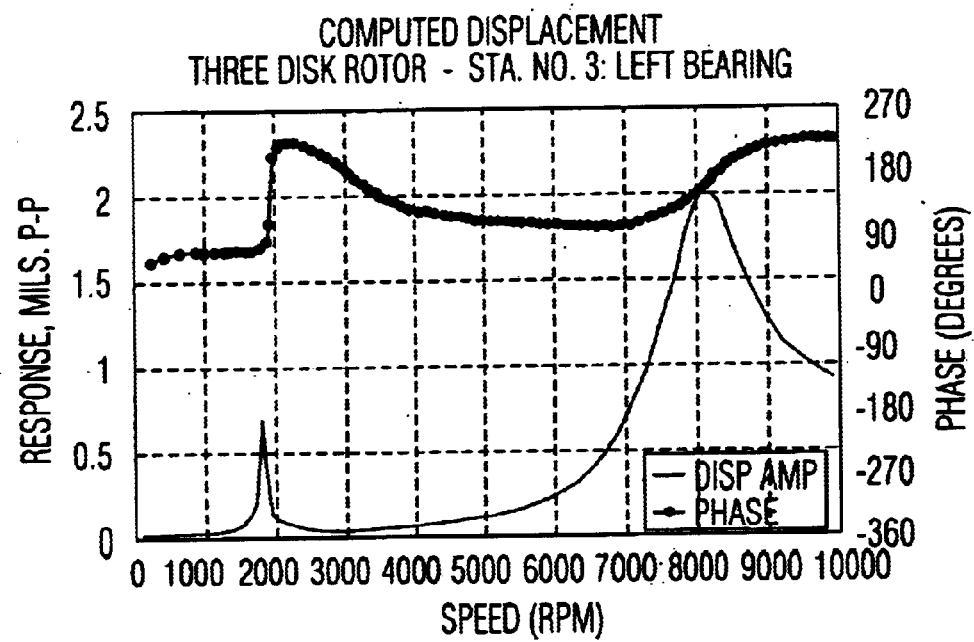
FIG. 14 is a graph showing an exemplary computed displacement for a ball-in-socket style bearing.

The following example was performed by utilizing an FFPI sensor fitted into a 2.5 inch, four (4) pad, ball-in-socket bearing of the type illustrated in FIGS. 4–6 and described herein. Specifically, the FFPI sensor was inserted into the bolt securing the ball to the housing, thus ensuring that the load was transmitted from the pivot to the bolt and sensor. A test rig (not shown) having a three-disk rotor characteristic of many industrial machines capable of running up to 10,000 rpm was utilized with the bearing assembly. Two forward critical speeds existed for the rotor-bearing test system. Charts showing the load vs. voltage calibration curve, measured dynamic load and computed dynamic load for this example are shown in FIGS. 10–12. FIGS. 13 and 14 illustrate the measured displacement and calculated displacement for the same 2.5 inch, four (4) pad, ball-in-socket bearing utilizing standard 200 mV/mil proximity probes utilized throughout the industry and available from suppliers such as Bently Nevada of Miden, Nev. As can be seen in FIGS. 11–14, the critical speeds are substantially equal as measured by the fiber optic sensor and the proximity sensor.

It will be appreciated the bearing assembly having a fiber optic sensor as described herein can accurately measure dynamic load on the bearing during use in an easy, cost-effective manner. In addition, the sensor can also warn of unacceptable displacement of the shaft, since the dynamic load will increase unacceptably if shaft displacement becomes problematic.

It will be understood that various modifications may be made to the embodiment disclosed herein. Although variable geometry bearings are provided in the illustrative embodiments, the disclosure is not limited thereto and fixed geometry bearings, as well as other variable geometry bearings are within the scope of the present disclosure. Likewise, the FFPI sensor disclosed herein may be replaced with other fiber optic sensors known to those of skill in the art. Also, the sensor may be fitted within the bearing other than through a channel, as would be known to those of skill in the art. Therefore, the above description should not be construed as limiting, but merely as exemplifications of a preferred embodiment. Those skilled in the art will envision other modifications within the scope, spirit and intent of the invention.

We claim:

1. A hydrodynamic bearing, comprising:
   a housing;
   a bearing pad within said housing for supporting a rotating shaft positioned through said housing;
   a bearing pad support positioned between said bearing pad and said housing to support said bearing pad;
   a fiber optic strain sensor extending through said bearing pad support into said bearing pad for sensing a load exerted by said shaft on said bearing pad.

2. The hydrodynamic bearing of claim 1, wherein said housing, said bearing pad, and said bearing pad support define a flexure pivot bearing, and said bearing pad support is comprised of a post which enables said bearing pad to tilt.

3. The hydrodynamic bearing of claim 1, wherein said housing, said bearing pad, and said bearing pad support define a ball-in-socket bearing, and said bearing pad support is comprised of a ball.

4. The hydrodynamic bearing of claim 1, wherein said housing, said bearing pad, and said bearing pad support define a ball-in-socket bearing, said bearing pad support is comprised of a ball, and further including a fastener positioned through said ball to secure said ball to said housing, wherein said strain sensor is positioned through a channel in said fastener, said fastener including threads only along a bottom portion thereof inside said ball to avoid compressing an upper portion of said strain sensor inside said fastener.

5. The hydrodynamic bearing of claim 1, wherein said strain sensor is positioned for being perpendicular to an axis of said shaft.

6. The hydrodynamic bearing of claim 1, wherein said bearing pad support and said strain sensor are positioned for being perpendicular to an axis of said shaft, and said strain sensor is positioned along a central axis of said bearing pad support.

7. The hydrodynamic bearing of claim 1, wherein said strain sensor is comprised of an optical fiber with a pair of internal mirrors defining an optical cavity there between, and said optical cavity is at least partially positioned in said bearing pad support for sensing said load on said bearing pad support.

8. The hydrodynamic bearing of claim 1, further including a signal conditioning unit connected to said strain sensor to convert an optical signal from said strain sensor into an output voltage readable on a display connected to said signal conditioning unit.

9. A method for measuring bearing load, comprising the steps of:

provoiding a bearing comprising a housing, a bearing pad within said housing for supporting a rotating shaft, a bearing pad support positioned between said bearing pad and said housing, and a fiber optic strain sensor extending into said bearing pad through said bearing pad support;

sensing a load exerted by said shaft on said bearing pad and said bearing pad support with said strain sensor; and converting a light signal produced by said strain sensor in response to said load into an electrical voltage.

10. The method of claim 9, further including a calibration procedure for determining a relationship between said load and a strain measured by said strain sensor, comprising the steps of:

providing a horizontal support member with a non-rotating shaft attached to an upper surface thereof;

providing a looped cable attached to a calibrated static force sensor which is attached to a tension device;

positioning said bearing flat on said support member with said non-rotating shaft engaged against said bearing pad;

positioning said looped cable around said bearing with said tension device radially opposite said bearing pad;

varying tension on said cable with said tension device to adjust said load on said bearing pad to generate an optical signal in said strain sensor;

converting said optical signal into a load measurement; and comparing said load measurement to a calibration force measured by said calibrated static force sensor.

* * * * *